(12) United States Patent
Pizzirani

(10) Patent No.: US 6,394,010 B1
(45) Date of Patent: May 28, 2002

(54) CAROUSEL-TYPE DISTRIBUTION UNIT FOR HANDLING AND PLANTING VEGETABLE SPECIES

(75) Inventor: Alberto Pizzirani, Molinella (IT)

(73) Assignee: Checchi & Magli S.r.l., Budrio (IT)

( * ) Notice: Subject to any disclaimer, the term of this patent is extended or adjusted under 35 U.S.C. 154(b) by 0 days.

(21) Appl. No.: 09/918,526

(22) Filed: Aug. 1, 2001

(30) Foreign Application Priority Data

Aug. 4, 2000 (IT) ..................................... BO2000A0490

(51) Int. Cl.⁷ ............................................... A01C 11/00
(52) U.S. Cl. ....................................................... 111/104
(58) Field of Search ................................ 111/104, 105, 111/200

(56) References Cited

U.S. PATENT DOCUMENTS 5,536,218 A * 7/1996 Lambert .................. 111/104 X
5,564,352 A * 10/1996 Kondo et al. ................ 111/104
5,983,812 A * 11/1999 Shokaku et al. ............. 111/104

* cited by examiner

Primary Examiner—Christopher J. Novosad
(74) Attorney, Agent, or Firm—Guido Modiano; Albert Josif; Daniel O'Byrne

(57) ABSTRACT

A carousel-type distribution unit for handling and planting vegetable species, the carousel containing a plurality of conical cups, each whereof is composed of two half-cones which are articulated about substantially horizontal axes, the cups being adapted to contain the vegetable species and to open in order to plant them, the unit further comprises two arms which are fixed to the center of the carousel and are adapted to open two of the cups in order to release the plant species into two respective conveyance channels for guiding into respective internal chambers of respective hollow plowshares, from which the plant species are expelled by respective ejector feet into the furrows of the soil provided by the plowshares and arranged along two mutually staggered adjacent rows.

7 Claims, 5 Drawing Sheets

CAROUSEL-TYPE DISTRIBUTION UNIT FOR HANDLING AND PLANTING VEGETABLE SPECIES

BACKGROUND OF THE INVENTION

The present invention relates to a carousel-type distribution unit for handling and planting vegetable species.

It is known that currently there is a demand for devices for agricultural use capable of facilitating the transplanting of new plants, such as for example tomato plants.

In particular, devices are known having a carousel in which the plants to be planted are placed manually. The carousel is provided with mechanisms which periodically expel a plant from the carousel and convey it, within a guiding channel, to the furrow produced by an appropriate plowshare which cuts through the soil below said channel. In this manner it is possible to plant rows of new plants simply by loading the carousel of the distribution unit.

Although these devices considerably facilitate transplanting, there is still the limitation of having to use an operator assigned to refilling the distribution unit in order to deposit a single row of plants at each pass over the field.

SUMMARY OF THE INVENTION

The aim of the present invention is to obviate the above-mentioned shortcomings of known devices, by providing a carousel-type distribution unit for handling and planting vegetable species, which is capable of planting simultaneously two adjacent rows of plants arranged at a mutual presettable distance and staggered quincuncially, managed by a single operator for two rows of plants.

Within this aim, an object of the present invention is to provide a structure which is simple and sturdy, relatively easy to provide in practice, and can be handled by a single operator.

Still another object of the present invention is to provide a structure which is safe in use, effective in operation and relatively low in cost.

This aim and these and other objects which will become better apparent hereinafter are achieved by the present carousel-type distribution unit for handling and planting vegetable species, provided with a carousel containing a plurality of conical cups, each whereof is composed of two half-cones which are articulated about substantially horizontal axes, the cups being suitable to contain the vegetable species and to open in order to plant them, characterized in that it comprises two arms which are fixed to the center of said carousel and are adapted to open two of said cups in order to release the plant species into two respective conveyance channels for guiding into respective internal chambers of respective hollow plowshares, from which the plant species are expelled by respective ejector feet into the furrows of the soil provided by said plowshares and arranged along two mutually staggered adjacent rows.

BRIEF DESCRIPTION OF THE DRAWINGS

Further characteristics and advantages of the present invention will is become better apparent from the detailed description of a preferred but not exclusive embodiment of a carousel-type distribution unit for handling and planting vegetable species, according to the invention, illustrated only by way of non-limitative example in the accompanying drawings, wherein.

DESCRIPTION OF THE PREFERRED EMBODIMENTS

Figure 1:
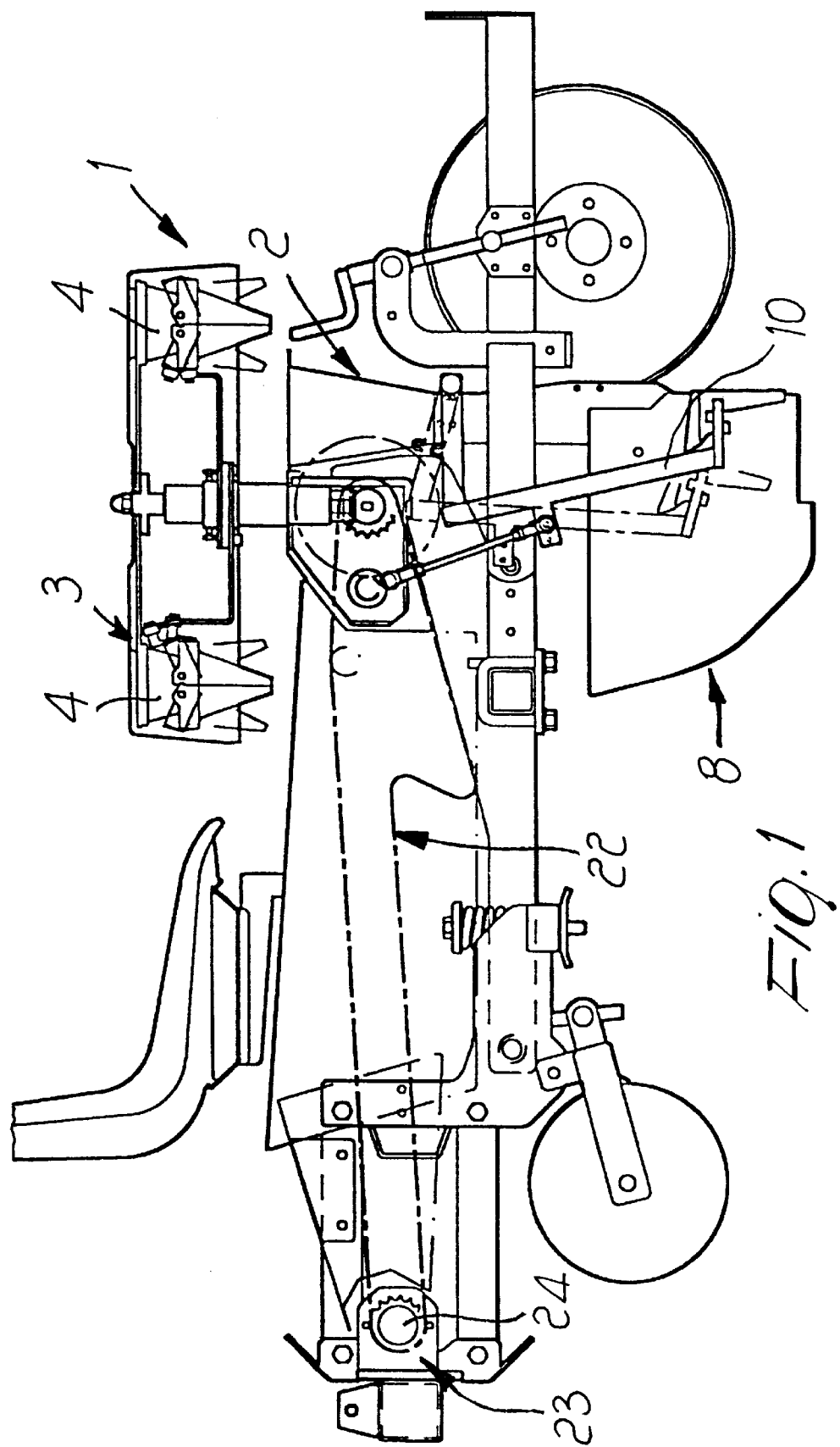
FIG. 1 is an elevation view of a carousel-type distribution unit according to the present invention, mounted on an agricultural machine.

With reference to the figures, the reference numeral 1 generally designates a carousel-type distribution unit for handling and planting vegetable species according to the invention.

The distribution unit 1 is of the type that can be mounted on a frame 2 of an agricultural machine and is composed of a carousel 3, along the circumference of which there are twelve conical cups 4, each of which is composed of two half-cones 4a and 4b mutually articulated about two respective pivots 5 which have a substantially horizontal axis.

The cups 4 are adapted to contain the plant species and to open and drop the plants contained therein into two underlying conveyance channels 6.

The conveyance channels 6 are arranged symmetrically with respect to the vertical axis of rotation of the carousel 3 in a peseudodiametrical position.

The channels 6 have an upper inlet 6a shaped like a truncated pyramid and extending with a lower tube-shaped portion 6b which has a square cross-section and leads into a chamber 7 defined inside a respective hollow plowshare 8 which forms a furrow in the soil.

The plowshare 8 is provided by two mutually connected side walls 9 and contains a plant ejector foot 10.

Figure 2:
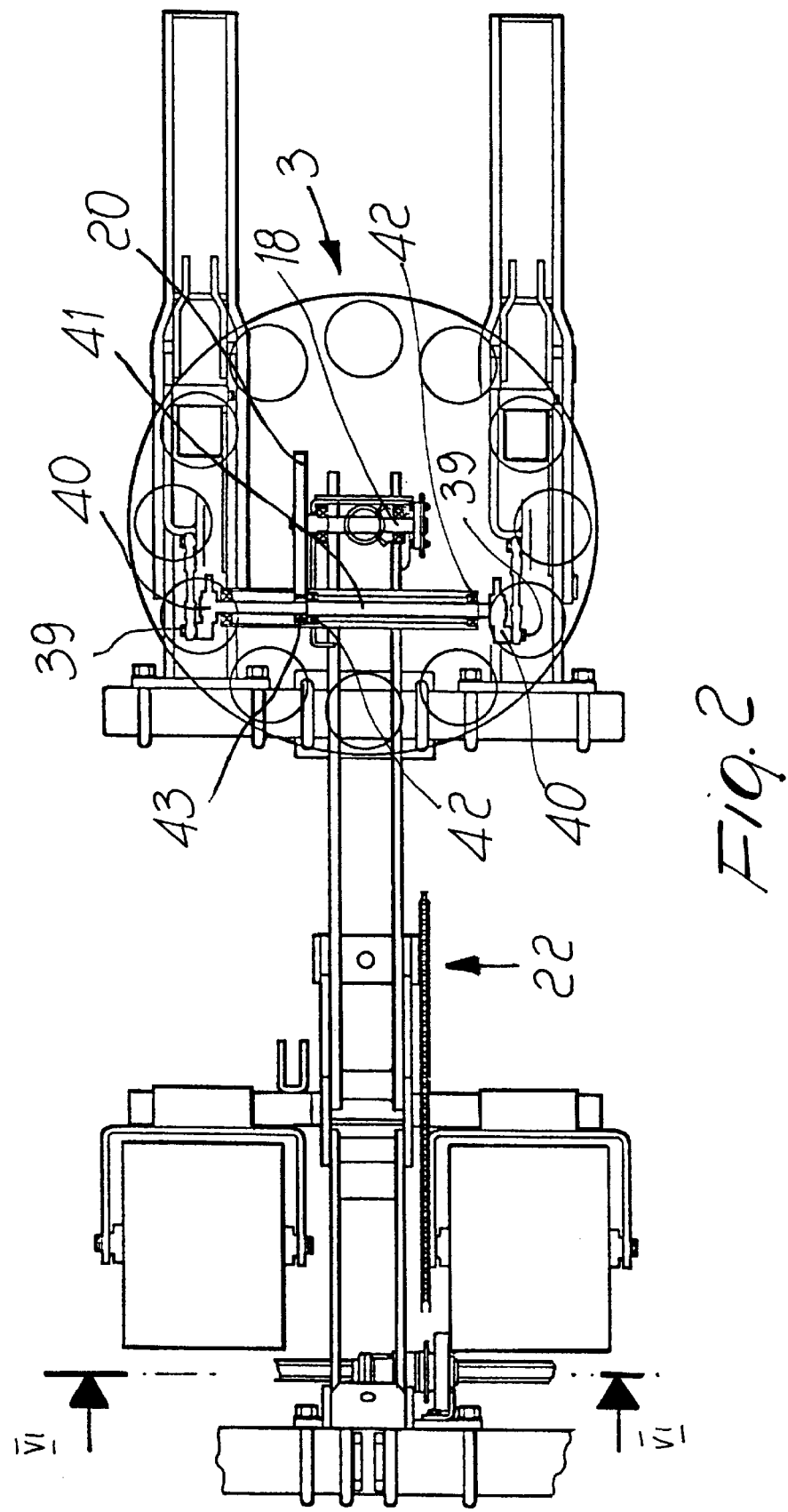
FIG. 2 is a plan view of the carousel-type distribution unit according to the present invention.
Figure 3:
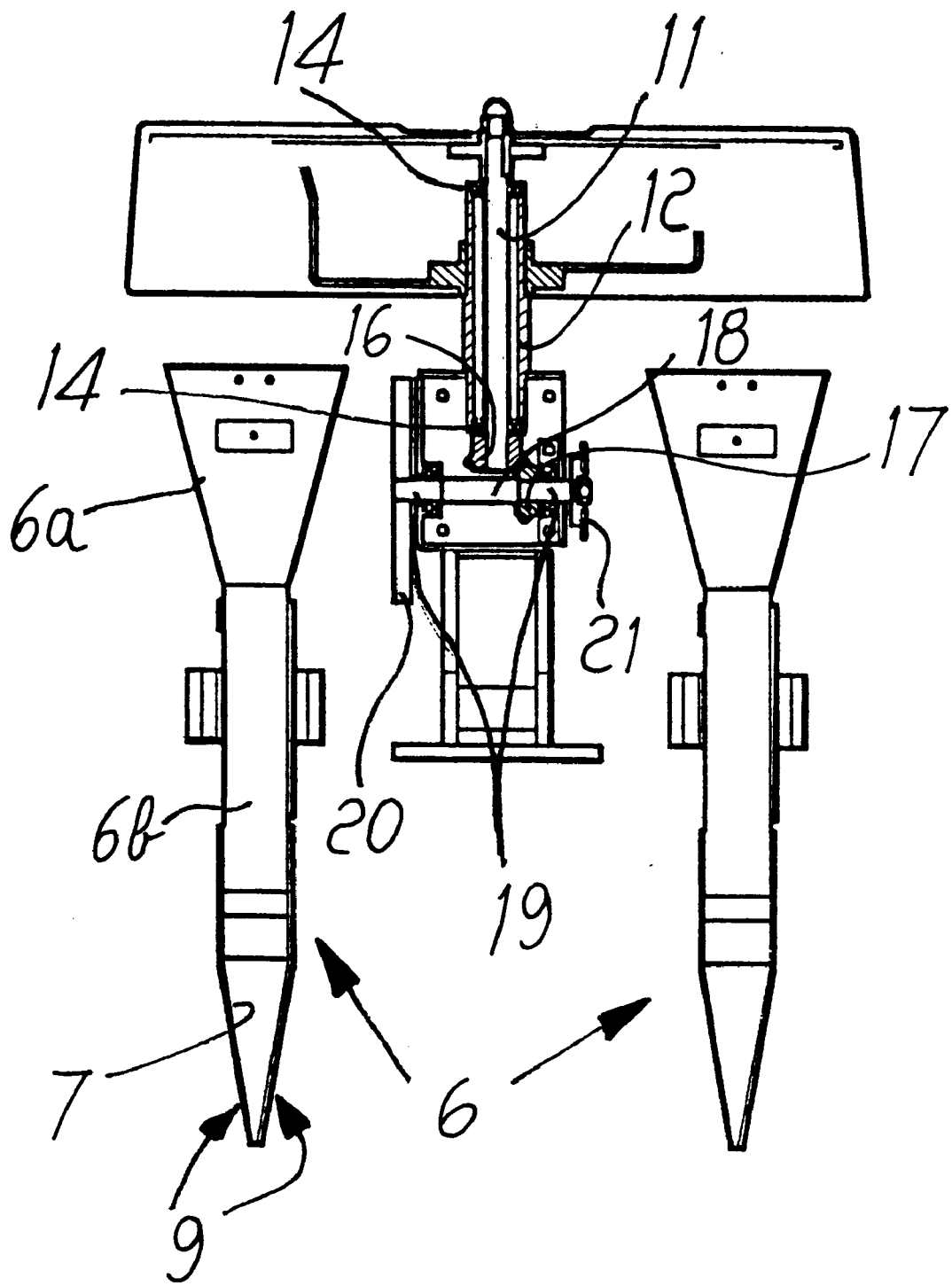
FIG. 3 is a sectional view, taken along the line III—III of FIG. 2, of a constructive detail of the carousel-type distribution unit.

FIGS. 1 and 2 illustrate the kinematic chain of the mechanical elements that transmit the rotary motion to the carousel 3.

The carousel 3 is driven by a vertical shaft 11 internally coaxial to a sleeve 12, which is rigidly coupled to the frame 2 and is designed to support the carousel 3.

The vertical shaft 11 is rotatably supported within the sleeve 12, with the interposition of two bearings 14, and is rigidly coupled to the carousel 3 by means of a contoured nut 15 screwed onto the upper end of the shaft 11.

A first bevel gear 16 is instead arranged at the lower end of the shaft 11 and meshes with a second bevel gear 17 which is keyed to a shaft 18 arranged substantially horizontally.

The shaft 18 is rotatably supported by two bearings 19 accommodated in seats which are fixed on the frame 2.

The bevel gear 17 is keyed in a central position on the shaft 18 and a cylindrical gear 20 and a first pinion 21 are keyed to the shaft 18 respectively at its opposite ends which lie on the outside of the bearings 19.

The pinion 21 meshes with a transmission chain 22, in turn driven by a second pinion 23 which is actuated by a driving bar 24 coaxial thereto.

Figure 6:
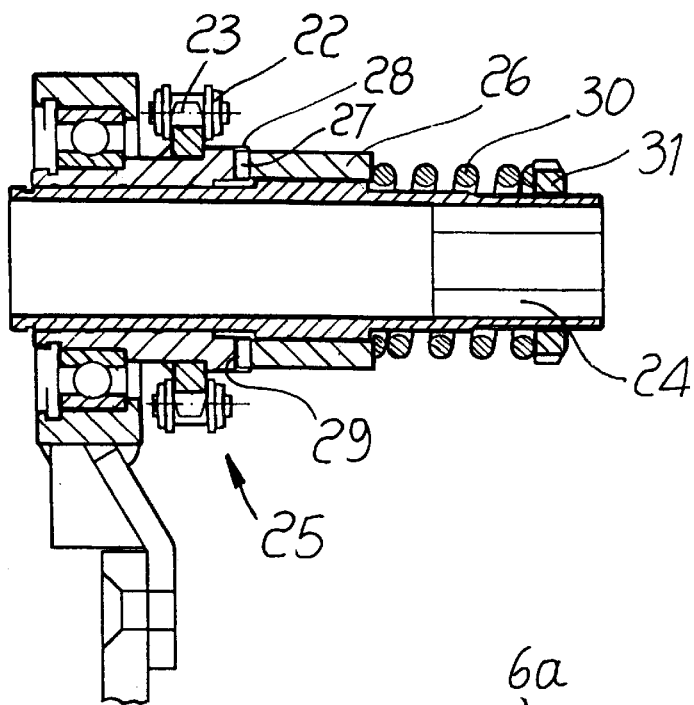
FIG. 6 is a sectional view, taken along the line VI—VI of FIG. 2, of the constructive detail of the torque limiter of the carousel-type distribution unit according to the present invention.

As shown more clearly in FIG. 6, a torque limiter, generally designated by the reference numeral 25, is interposed between the second pinion 23 and the driving bar 24.

The torque limiter 25 is composed of a sleeve 26, which rotates rigidly with the bar 24 and can slide axially thereon, and is provided with a series of six contoured protrusions 27 which engage respective seats 28 formed in the front side 29 of the second pinion 23.

The sleeve 26 is kept in contact with the second pinion 23 by a cylindrical spring 30 acting between an adjustment ring 31, which is screwed onto the bar 24, and the end of the sleeve 26.

In this manner, by adjusting the compression of the spring 30 against the sleeve 26 by means of the ring 31, it is possible to preset the torque to be transmitted by the driving bar 24 to the second pinion 23.

As to the torque limiter 25, it should be noted that among the protrusions 27, there is one which is larger. A direct consequence of this particularity is that if the transmissible torque is exceeded and the connection between the sleeve 26 and the second pinion 23 is lost, the protrusions 27 of the sleeve 26 must perform a full turn about their rotation axis, in order to reengage the seats 28 of the pinion 23. This ensures that synchronization is maintained between the corresponding parts of the distribution unit 1 and in particular that the quincuncial layout of the plants in the soil is not altered.

Figure 4:
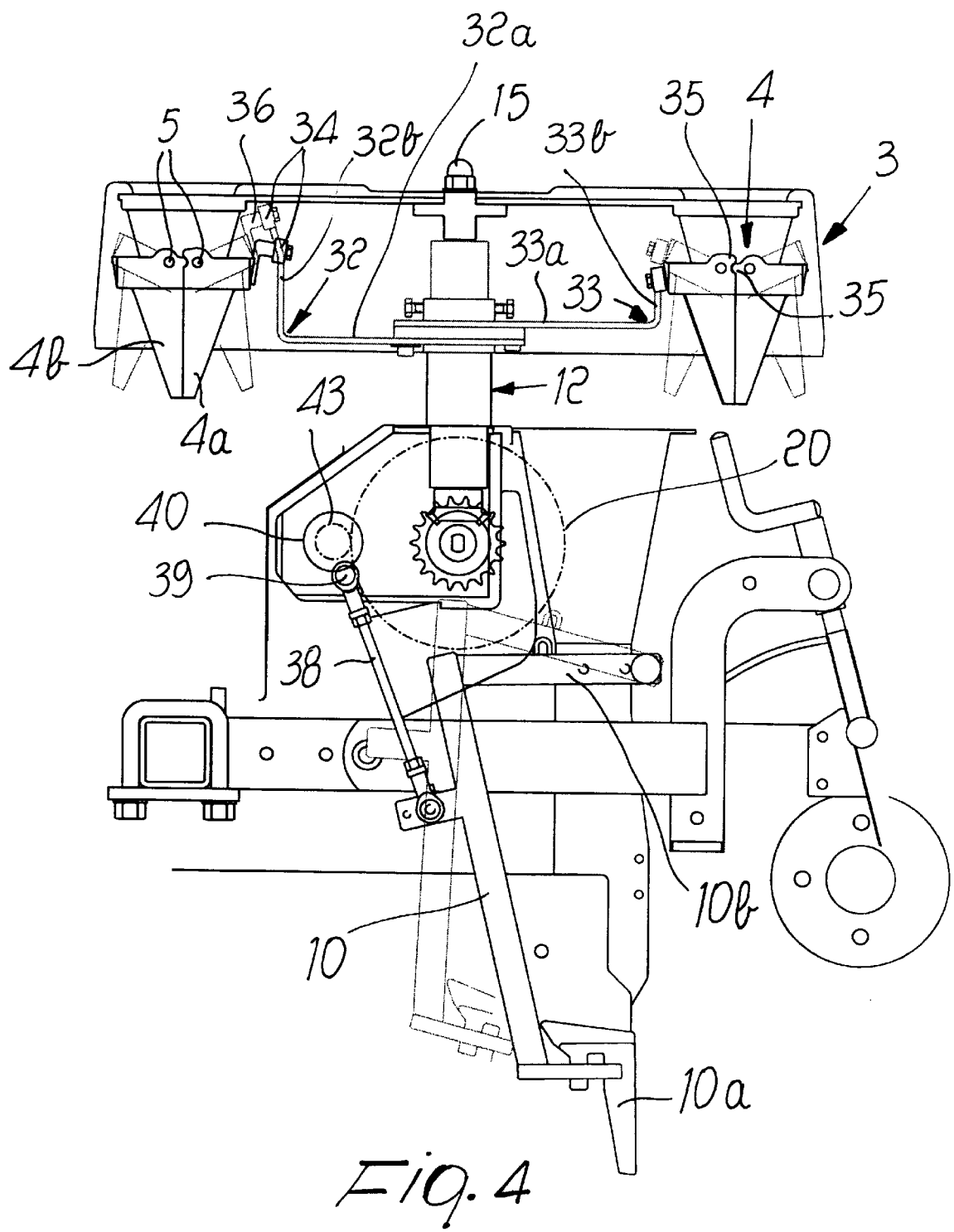
FIG. 4 is an enlarged-scale elevation view of the carousel-type distribution unit according to the present invention.

FIGS. 1 and 4 illustrate more clearly the mechanical elements that control the opening of the cups 4 containing the plant species to be planted.

Such figures show that at the center of the carousel 3 there are two arms 32, 33 which lie one above the other, are rigidly coupled to the sleeve 12, and are mutually angularly spaced.

The arms 32, 33 are substantially L-shaped, since each one is composed of a first horizontal portion 32a, 33a, which is substantially radial, and of a second vertical portion 32b, 33b, which is perpendicular to the first horizontal portion 32a, 33a.

The arms 32, 33 are adapted to abut against respective rollers 34 which are mounted so as to be laterally rigidly coupled to the half-cones 4a of the cups 4.

The second portions 32b, 33b abut periodically, at each turn of the carousel 3 against the rollers 34 of the cups 4 which move together with the carousel 3. In this manner, the arms 32, 33 act as cams for the rollers 34.

When the rollers 34 encounter the arms 32, 33, they pass over and beyond them, imparting the opening movement to the half-cones 4a. In turn, the half-cones 4a lift the half-cones 4b, since they are connected thereto by way of lobe-shaped portions 35 which affect the region proximate to the articulation pivots 5. In this manner, the two half-cones 4a and 4b open together, dropping the plant that they contain into the respective underlying conveyance channels 6 and thence into the chamber 7 defined inside each one of the two hollow plowshares 8 that form a furrow in the soil.

In particular, the rollers 34 are mounted on the half-cones 4a at different heights; more specifically, six of the twelve half-cones 4a are connected to said rollers 34 in a raised position with respect to the remaining ones, since spacer arms 36 are interposed on the former.

It should be noted that the half-cones 4a that have the spacer arms 36 are alternated with the half-cones that do not have them along the circumference of the carousel 3. Moreover, the respective ends of the portions 32b and 33b of the arms 32 and 33 are at different heights inside the carousel 3.

Since the rollers 34 and the portions 32b, 33b are arranged in this manner, it is evident that only the highest vertical portion 32b is adapted to open all and only the half-cones 4a provided with said spacer arms 36, while the remaining half-cones 4a are opened only by the lowest portion 33b.

This solution allows to open one half of the cups 4 with one arm 32 and the other half with the other arm 33, and it is also possible to provide equal timing gaps between the events for opening the cups 4 on the opposite sides of the carousel 3, allowing to provide arrangements of plants arranged in a quincuncial pattern, i.e., arranged along mutually staggered rows, by using the same carousel-type distribution unit 1.

Figure 5:
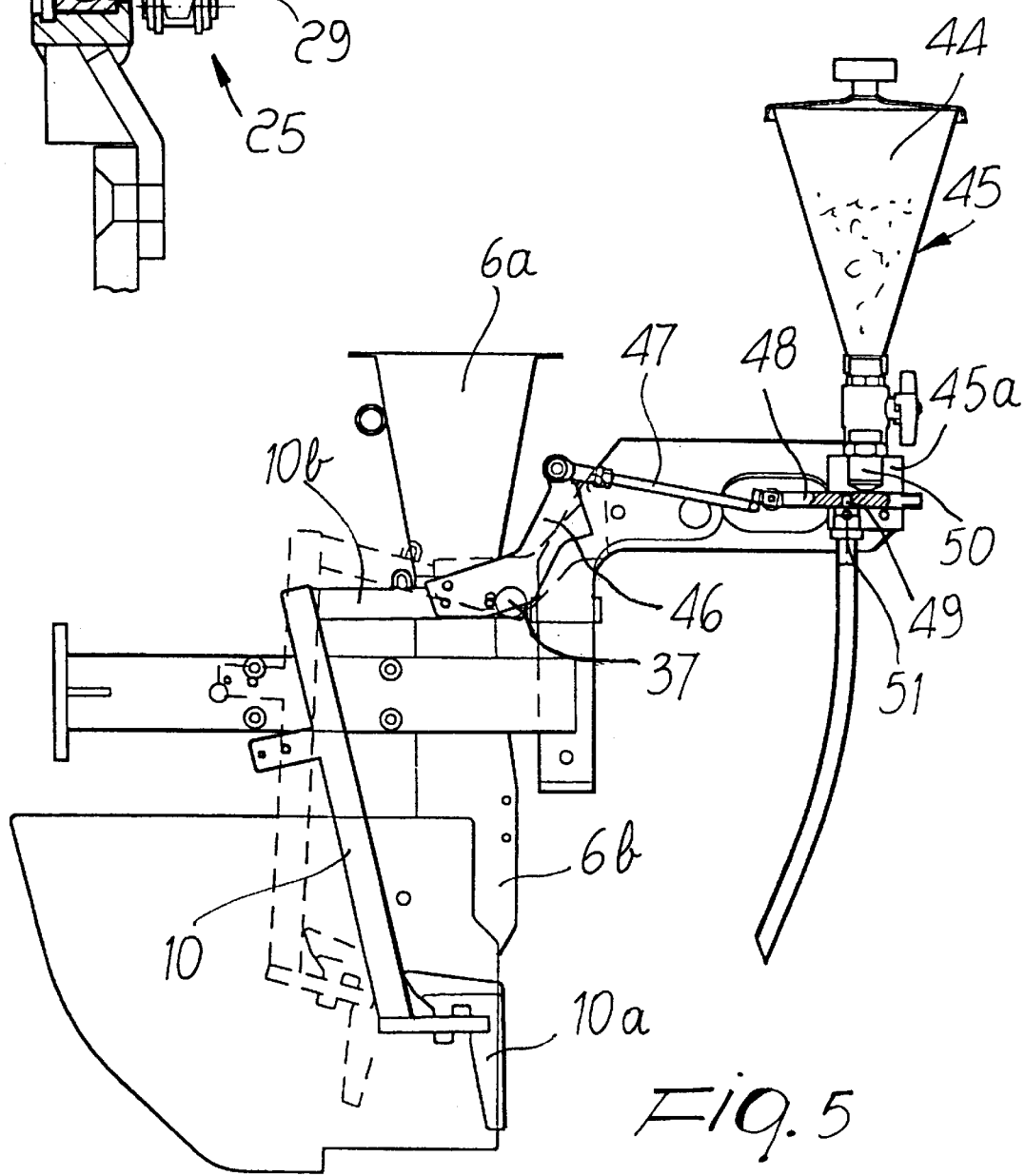
FIG. 5 is an enlarged-scale elevation view of the constructive details of the ejector foot and of the dispenser of microgranular weed and pest control agent.

As clearly shown in FIGS. 4 and 5, each ejector foot 10 has a profile which is generally C-shaped, with a contoured lower end 10a. The end 10a is adapted to delicately plant the plants that arrive from the conveyance channel 6, while the upper end 10b is rotatably articulated to a pivot 37 for connection to the frame 2.

Each one of the two ejector feet 10 is further connected, in a central position, to a linkage 38 which makes it move with a reciprocating curved motion centered on the pivot 37. The linkage 38 is arranged between said central portion of the ejector foot 10 and a pivot 39 of a crank 40.

The cranks 40 are arranged at the opposite ends of an auxiliary shaft 41 (see FIG. 2) which can rotate on bearings 42 accommodated in respective seats of the frame 2.

The auxiliary shaft 41 is substantially parallel to the shaft 18 and is driven thereby by means of the cylindrical gear 20, which meshes with a respective cylindrical gear 43 being keyed in the central portion of the auxiliary shaft 41.

As shown in FIG. 5, the ejector foot 10 further actuates the dispensing of the microgranular weed and pest control agent contained in the funnel 44 of a dispenser 45.

The ejector foot 10 is rigidly connected, proximate to the pivot 37 for articulation to the frame 2, to a rocker 46 acting on a rod 47, in turn connected to a plate-like valve 48 which controls the outflow of the weed and pest control agent from a lower part 45a of the dispenser 45.

The plate-like valve 48 has, across its thickness, a through hole 49 of presettable volume, in which a dose of weed and pest control agent is arranged. The valve 48 moves with a reciprocating rectilinear motion between a first position, in which the through hole 49 is aligned with a duct 50 that exits from the funnel 44, containing the weed and pest control agent, and a second position, in which the through hole 49 is aligned with an inlet 51 of a tube 52 for conveying the weed and pest control agent onto the soil.

In this manner, the dose of weed and pest control agent required to protect each planted plant is alternately loaded and released inside the through hole 49.

It has thus been shown that the invention achieves the intended aim and objects.

The invention thus conceived is susceptible of numerous modifications and variations, all of which are within the scope of the appended claims.

All the details may further be replaced with other technically equivalent ones.

In practice, the materials used, as well as the shapes and dimensions, may be any according to requirement without thereby abandoning the scope of the protection of the appended claims.

The disclosures in Italian Patent Application No. BO2000A000490 from which this application claims priority are incorporated herein by reference.

What is claimed is:

1. A carousel-type distribution unit for handling and planting vegetable species, provided with a carousel containing a plurality of conical cups, each whereof is composed of two half-cones which are articulated about substantially horizontal axes, said cups being suitable to contain the vegetable species and to open in order to plant them, further comprising two arms which are fixed to the center of said carousel and are adapted to open two of said cups in order to release the plant species into two respective conveyance channels for guiding into respective internal chambers of respective hollow plowshares, from which the plant species are expelled by respective ejector feet into the furrows of the soil provided by said plowshares and arranged along two mutually staggered adjacent rows.

2. The distribution unit according to claim 1, wherein the actuation system for opening the cups that contain the plant species comprises said two arms, which are mutually angularly spaced and are substantially L-shaped, each arm being composed of a first substantially radial horizontal portion and of a second vertical portion which is perpendicular to said first horizontal portion, said arms being further adapted to abut against respective rollers which are mounted so as to be laterally rigidly coupled to said half-cones.

3. The distribution unit according to claim 2, wherein said rollers are mounted on said half-cones at different heights, a first half of said cups having said rollers mounted on said half-cones in a raised position with respect to the remaining ones, spacer arms being interposed between said half-cones and said rollers in said first half of the cups, said cups provided with half-cones which have said spacer arms being alternated along the circumference of the carousel with those that do not have said arms.

4. The distribution unit according to claim 3, wherein in said arms the upper end of their respective vertical portions lies at different heights with respect to said carousel, a highest vertical portion being adapted to abut against and open all and only said half-cones provided with said spacer arms, a lowest vertical portion being adapted to abut against and open all, and only the remaining half-cones.

5. The distribution unit according to claim 1, wherein said ejector feet are actuated by respective linkages connected to respective crank pivots arranged at ends of an auxiliary shaft which is connected by means of two gears and first and second pinions which mesh with a chain, said second pinion being connected to a driving bar which is provided with a device for limiting a torque transmitted to said second pinion.

6. The distribution unit according to claim 5, wherein said torque limiter comprises a sleeve which is rotationally rigidly coupled to said bar and can slide axially thereon, said sleeve being provided with a series of shaped protrusions which engage respective seats formed in the side of said second pinion, said sleeve being kept in contact with said second pinion by a cylindrical spring which acts between an adjustment ring screwed onto said bar and said sleeve, said ring being further adapted to preset the torque that can be transmitted by said driving bar to said second pinion.

7. The distribution unit according to claim 6, wherein said shaped protrusions of said sleeve comprise one protrusion which is the largest and is suitable to provide a single position for engagement with the respective seats provided in a side of said second pinion, said single engagement position being further adapted to ensure that mutual synchronization for the opening of said cups and said ejector feet is maintained.

* * * * *